United States Patent
Sethuraman et al.

(10) Patent No.: US 10,901,657 B2
(45) Date of Patent: Jan. 26, 2021

(54) DYNAMIC WRITE CREDIT BUFFER MANAGEMENT OF NON-VOLATILE DUAL INLINE MEMORY MODULE

(71) Applicant: International Business Machines Corporation, Armonk, NY (US)

(72) Inventors: Saravanan Sethuraman, Bangalore (IN); Sumantra Sarkar, Hebbal (IN); Karthikeyan Natarajan, Bangalore (IN); Tathagato Bose, Kolkata (IN); Adam J. McPadden, Underhill, VT (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 124 days.

(21) Appl. No.: 16/203,775

(22) Filed: Nov. 29, 2018

(65) Prior Publication Data
US 2020/0174696 A1    Jun. 4, 2020

(51) Int. Cl.
*G06F 3/06* (2006.01)
*G06F 12/0868* (2016.01)

(52) U.S. Cl.
CPC .......... *G06F 3/0659* (2013.01); *G06F 3/0604* (2013.01); *G06F 3/068* (2013.01); *G06F 12/0868* (2013.01); *G06F 2212/1024* (2013.01); *G06F 2212/205* (2013.01); *G06F 2212/608* (2013.01)

(58) Field of Classification Search
CPC .. G06F 12/023; G06F 12/0868; G06F 3/0659; G06F 3/0604; G06F 3/068; G06F 11/34; G06F 2212/205; G06F 2212/1024; G06F 2212/311; G06F 2212/502; G06F 2212/608

See application file for complete search history.

(56) References Cited

U.S. PATENT DOCUMENTS

| | | | |
|---|---|---|---|
| 6,594,701 B1* | 7/2003 | Forin | G06F 12/1081 709/232 |
| 9,852,021 B2 | 12/2017 | Nale et al. | |
| 10,503,438 B1* | 12/2019 | La Fratta | G06F 3/061 |
| 10,747,605 B2* | 8/2020 | Nale | G06F 13/1663 |
| 2006/0136671 A1* | 6/2006 | Balakrishnan | G06F 12/0888 711/122 |
| 2012/0239860 A1 | 9/2012 | Atkisson et al. | |

(Continued)

OTHER PUBLICATIONS

H. Sai, D. Feng, J. Chen and J. Liu, "Caching on dual-mode flash memory," 2015 IEEE International Conference on Networking, Architecture and Storage (NAS), Boston, MA, 2015, pp. 326-335, doi: 10.1109/NAS.2015.7255199.*

*Primary Examiner* — Pierre Miche Bataille
(74) *Attorney, Agent, or Firm* — Cantor Colburn LLP; Bryan Bortnick

(57) ABSTRACT

Systems, methods, and computer program products for buffer management in a memory device are provided. Aspects include receiving, by a controller, a request to write a first data to a memory device, analyzing, by the controller, the first data to determine a data type for the first data, obtaining, by the controller, one or more input parameters associated with the memory device, and based on at least one of the one or more input parameters exceeding a first threshold, writing the first data to a write credit buffer.

14 Claims, 4 Drawing Sheets

(56) References Cited

U.S. PATENT DOCUMENTS

| | | |
|---|---|---|
| 2013/0086309 A1 | 4/2013 | Lee et al. |
| 2016/0139807 A1 | 5/2016 | Lesartre et al. |
| 2016/0350002 A1 | 12/2016 | Vergis et al. |
| 2017/0091120 A1 | 3/2017 | Gopal et al. |
| 2017/0153826 A1 | 6/2017 | Cho et al. |
| 2017/0228190 A1 | 8/2017 | Guddekoppa |
| 2018/0081555 A1 | 3/2018 | Noguchi et al. |
| 2019/0129656 A1* | 5/2019 | Bains .................... G06F 3/0613 |
| 2019/0236030 A1* | 8/2019 | Lim ...................... G06F 3/0613 |
| 2019/0370073 A1* | 12/2019 | Behar .................... G06F 9/505 |
| 2020/0050366 A1* | 2/2020 | Bavishi ................. G06F 3/0604 |
| 2020/0050390 A1* | 2/2020 | Bavishi ................. G06F 3/0679 |

* cited by examiner

DYNAMIC WRITE CREDIT BUFFER MANAGEMENT OF NON-VOLATILE DUAL INLINE MEMORY MODULE

BACKGROUND

The present invention generally relates to non-volatile dual inline memory modules (NVDIMM), and more specifically, to the management of dynamic write credit buffers in an NVDIMM.

NVDIMMs are typically accessed by a media controller at memory or near-memory speeds. NVDIMMs may incorporate DRAM, flash memory, control logic and an independent power source to retain in-memory data through unexpected power loss events, such as system crashes or planned shutdowns. During normal operation, the NVDIMM appears to the host system as a DRAM memory module, providing the speed, latency and endurance benefits of DRAM. In the event of an unexpected power loss or system crash, the data residing in the DRAM is saved to flash memory. When power is returned, the in-memory state of the DRAM is restored from flash memory. For most NVDIMM solutions, the backup power to transfer the DRAM contents to flash is provided by supercapacitors or other backup power sources. For example, an NVDIMM plugs into a dual inline memory module (DIMM) socket and operates as a DRAM DIMM during runtime.

SUMMARY

Embodiments of the present invention are directed to a computer-implemented method for buffer management in a memory device. A non-limiting example of the computer-implemented method includes receiving, by a controller, a request to write the first data to a memory device, analyzing, by the controller, the first data to determine a data type for the first data, obtaining, by the controller, one or more input parameters associated with the memory device, and based on at least one of the one or more input parameters exceeding a first threshold, writing the first data to a write credit buffer.

Embodiments of the present invention are directed to a system for buffer management in a memory device. A non-limiting example of the system includes a processor configured to perform a method including receiving, by a controller, a request to write a first data to a memory device, analyzing, by the controller, the first data to determine a data type for the first data, obtaining, by the controller, one or more input parameters associated with the memory device, and based on at least one of the one or more input parameters exceeding a first threshold, writing the first data to a write credit buffer.

Embodiments of the invention are directed to a computer program product for buffer management in a memory device, the computer program product comprising the computer readable storage medium having program instructions embodied therewith. The program instructions are executable by a processor to cause the processor to perform a method. A non-limiting example of the method includes receiving, by a controller, a request to write the first data to a memory device, analyzing, by the controller, the first data to determine a data type for the first data, obtaining, by the controller, one or more input parameters associated with the memory device, and based on at least one of the one or more input parameters exceeding a first threshold, writing the first data to a write credit buffer.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
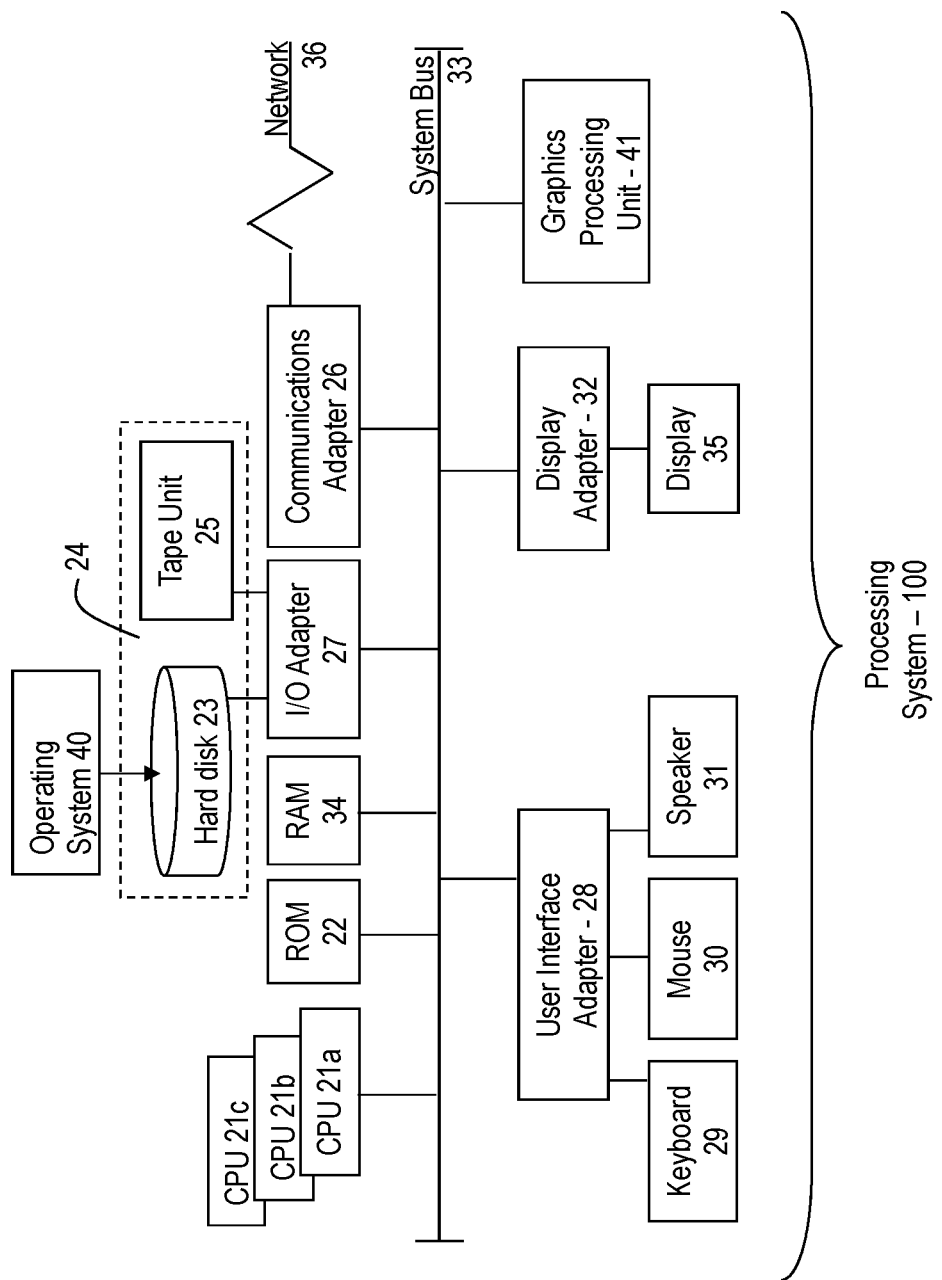
FIG. 1 depicts a block diagram of a computer system for use in implementing one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising,"

"includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 200.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including the system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

Turning now to an overview of technologies that are more specifically relevant to aspects of the invention, an NVDIMM is a type of random-access memory for computer and server devices and any other storage platform. NVDIMMs, typically, include both non-volatile memory storage and volatile memory storage. Non-volatile memory is a memory that retains its contents even when electrical power is removed, for example from an unexpected power loss, system crash, or normal shutdown. The NVDIMM typically includes an on-board backup power source to power the volatile memory during a power loss to dump the contents of the volatile memory to the non-volatile memory. NVDIMM-P offers higher FLASH memory capacity connected to host directly and it offers lower latency and higher capacity memory compared to NVDIMM-N. NVDIMM-N works based on a Save N signal sent from the host to back up the data-powered using a supercapacitor. NVDIMM-P allows the host to modify the data inside FLASH and DRAM during normal operation. NVDIMM-P support a shared buffer which directs the writes of dynamic writes and persistent writes to appropriate media directed by media controller 202.

Figure 2:
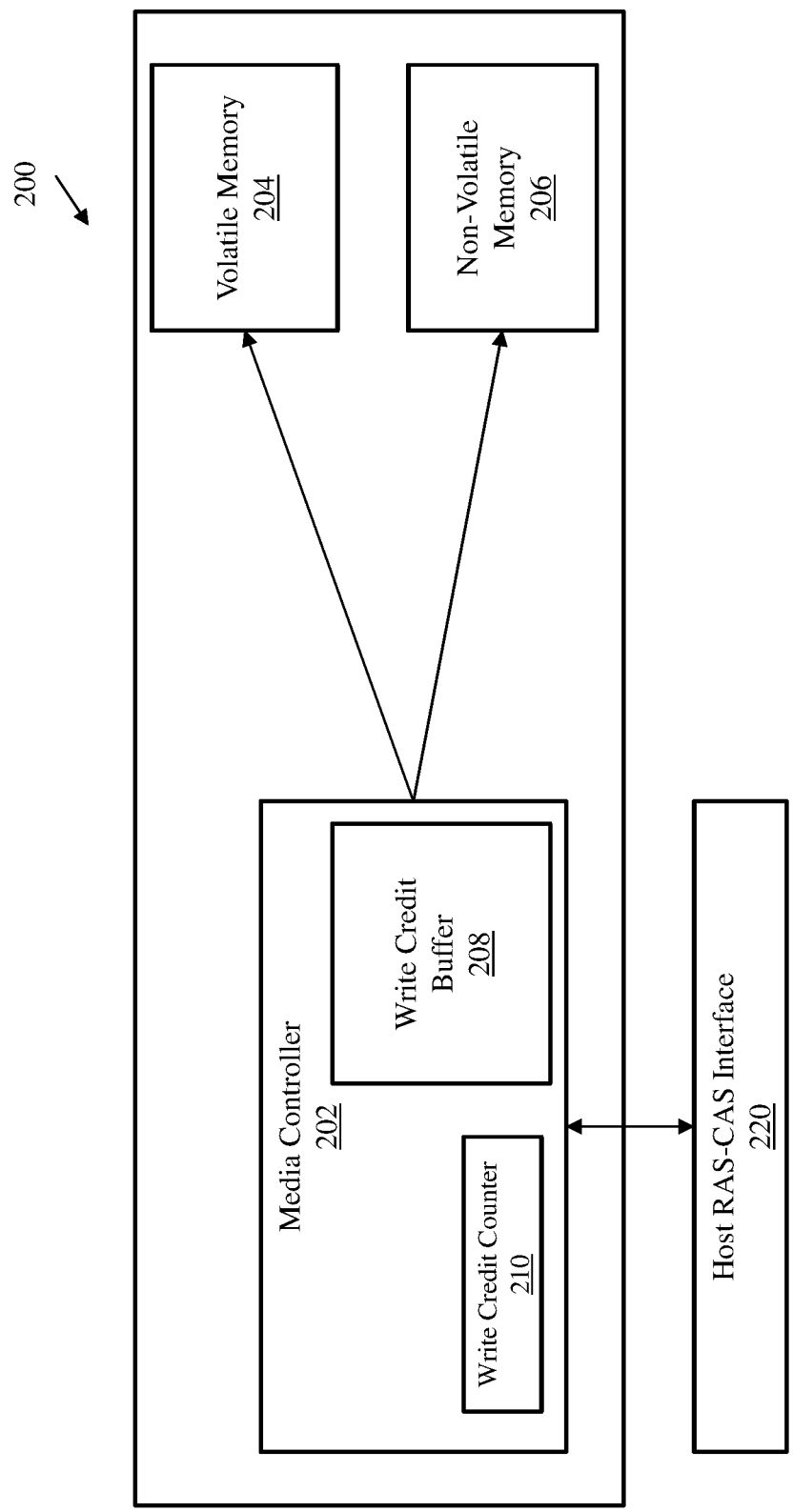
FIG. 2 depicts a block diagram of an NVDIMM to be utilized in accordance with one or more embodiments of the invention.

FIG. 2 depicts a block diagram of an NVDIMM to be utilized in accordance with one or more embodiments of the invention. The NVDIMM 200 includes a volatile memory 204, a non-volatile memory 206, and a media controller 202. The NVDIMM 200 is communicatively coupled to a host computer RAS-CAS interface 220. The media controller 202 can communicate with the host computer through the interface 220 and receive save commands for cache lines from a host computing device. The NVDIMM 200 also includes a write credit buffer 208 and a write credit counter 210. In one or more embodiments, the write credit buffer 208 is a buffer between the volatile memory 204 and the non-volatile memory 206. The write credit buffer 208 includes an allocation for dynamic data writes (XWRITEs) and for persistent data writes (PWRITEs). The allocation for the XWRITEs and the PWRITEs can be adjusted using a boundary pointer to modify the performance of the NVDIMM 200 depending on application characteristics accessing the NVDIMM 200. This allocation for XWRITEs and PWRITEs can be captured using the write credit counter 210. The write credit counter 210 can constrain the number of remaining slots to perform an XWRITE or PWRITE in the write credit buffer 208. Each XWRITE or PWRITE command decrements the write credit counter by 1 when a host device sends a write (save) operation to the write credit buffer 208 in the NVDIMM 200. A write credit can be transferred as part of a user-data from the host device align with the reading/writing commands.

In one or more embodiments of the invention, based on the characteristics of a power-hungry workload, latency constrained application, thermal criticality, the boundary pointer can be adjusted to match performance requirements with buffer allocation of XWRITEs and PWRITEs. The state of power of the NVDIMM 200 and the temperature of both the volatile memory and the nonvolatile memory can be monitored through an I2C bus by the media controller 202. The media controller 202 can throttle the flow of instructions to the different memories in the NVDIMM 200 based on power and temperature thresholds. That is to say, a write management problem between PWRITEs and XWRITEs where input parameters involving external conditions of power, thermal criticality, latency, and endurance requirements is being solved by throttling the flow of writes, by a media controller 202 in the NVDIMM 200, in to the write credit buffer 208 thus controlling the performance of the NVDIMM 200 dynamically.

In one or more embodiments of the invention, the volatile memory 204 can be a DRAM. The non-volatile memory 206 can be any of a flash memory, ReRAM, MRAM, and the like.

Figure 3:
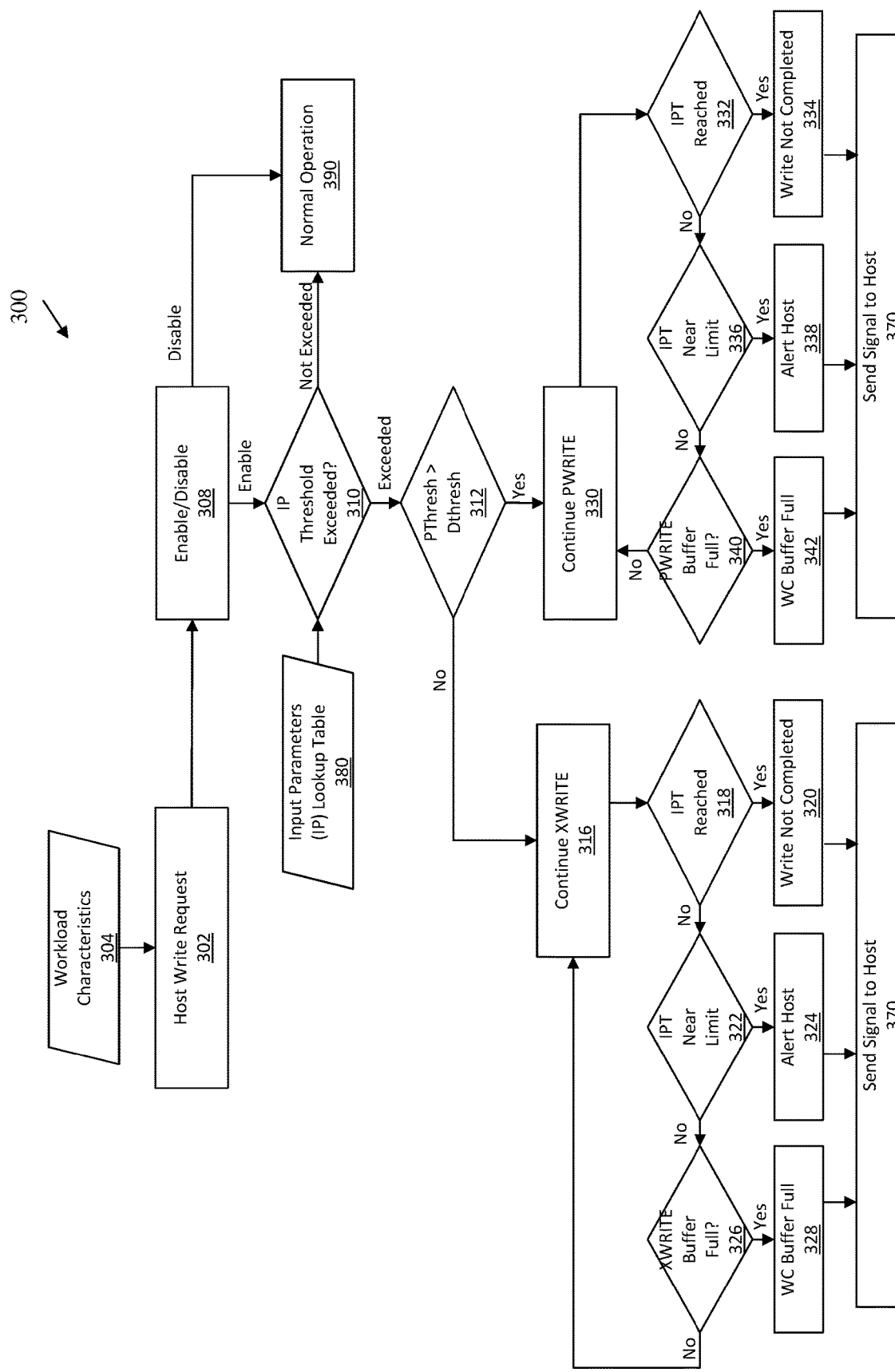
FIG. 3 depicts a flow diagram of a process for buffer management in an NVDIMM according to one or more embodiments of the invention.

In one or more embodiments of the invention, the media controller 202 can manage the writing of cache lines from a host computing device to the NVDIMM 200. To achieve this, the media controller 202 can analyze the type of data in the cache line through the usage of a tag to show the cache line is to be written to a persistent (e.g., non-volatile) memory or to a dynamic (e.g., volatile) memory. The media controller 202 can monitor certain input parameters associated with power, thermal criticality, latency, and endurance requirements of the volatile 204 and non-volatile 206 memories and throttle the writes to these two memories. FIG. 3 depicts a flow diagram of a process for buffer management in an NVDIMM according to one or more embodiments of the invention. The process begins at block 302 where a host writes request is received by the media controller 202 for a workload, the workload characteristics 304 are taken from the host which includes a tag indicating whether the write is a persistent write (PWRITE) or a dynamic write (XWRITE). In one or more embodiments of the invention, the workload can be a request to write data to memory. The data can be, for example, a cache line from a host computing device and tagged to indicate the cache line is to be written to either persistent or dynamic memory. The media controller 202 determines at block 308 whether the write credit buffer protocol is enabled for setting performance characteristics. If the write credit buffer protocol is disabled, the media controller 202 operates the memory in normal operation as shown at block 390. If the write credit buffer protocol is enabled at block 308, the process 300 continues to a decision block 310 which obtains input parameter thresholds from the input parameter threshold lookup table 380 and compares the input parameters to the input parameter thresholds (IPT). As mentioned above, the input parameters are associated with the power, thermal criticality, latency, and endurance requirements of the volatile 204 and non-volatile 206 memories. If, at decision block 310, the IPTs have not been exceeded based on an analysis of the input parameters, the media controller 202 operates the NVDIMM 200 under normal operation, as shown at block 390. Normal operation in this sense means the media controller 202 does not throttle XWRITEs or PWRITEs in the memory.

In one or more embodiments of the invention, if the input parameter values exceed at least one of the IPTs, the decision block 310 the workload (e.g., data) is written to the write credit buffer 208. The write credit buffer 208 includes a PWRITE buffer and an XWRITE buffer. Based on the data type (e.g., tag), the workload is written to the corresponding buffer. For example, persistent data is written to the PWRITE buffer inside the write credit buffer 208 and dynamic data is written to the XWRITE buffer. As data is being written into the write credit buffer 208, the media controller 202 can determine which writes to perform (e.g., XWRITE v. PWRITE) based on decision block 312 which compares whether a persistent threshold is higher than a dynamic threshold. If the persistent threshold is higher than the dynamic threshold, the process 300 continues to block 316 where an XWRITE is performed by the media controller 202. Before the XWRITE is completed, the media controller 202 checks to see if the input parameters that are related to the dynamic memory have exceeded the corresponding IPTs, as shown at decision block 318. If the corresponding IPTs have been exceeded by at least one of the input parameter values, the process 300 signals a write not completed 320 signal and transmits this signal to the host device, as shown at block 370. If the corresponding IPTs have not been exceeded, the process 300 proceeds to decision block 322 which analyzes whether the input parameters related to the dynamic memory are near the IPTs (e.g., within a certain parameter value of the IPT). For example, a power consumption parameter can be set to where if the power consumption is within five, for example, percentage points of the IPT for power consumption, the decision block would indicate that "Yes" the IPTs are near the parameter limit and then generate an alert the host signal, as shown at block 324. The signal would be sent back to the host as shown in block 370. If the input parameters are not near the IPTs, the process 300 proceeds to decision block 326 which analyzes whether the XWRITE buffer is full, at decision block 326. If the XWRITE buffer is full, a buffer full signal is generated at block 328 and sent along to the host, as shown at block 370. If the XWRITE buffer is not full, the write credit buffer proceeds to perform the XWRITE 316 to the dynamic memory in the NVDIMM 200. When the XWRITE is performed, the write credit counter 210 will decrement by one for XWRITEs. The Write Credit buffer 208 is constrained to have a buffer width corresponding to write credit counter 210. The Write credit counter 210 can be initialized so as to improve performance, power or thermal criticality of the generic NVDIMM device. Write a credit counter can be initialized with a value that could be a multiple of $2^m$. For example, the write credit counter 210 could decrement from the value of M slots instead of N available slots to write so as to throttle the available write going into the shared buffer. The values M, N can be user programmable values. The number of available slots to write into XWRITE or PWRITE can be customized based on criticality of power, thermal, and bandwidth requirements.

In one or more embodiments of the invention, at decision block 310 if the persistent threshold is less than the dynamic threshold, the process 300 continues to block 330 where a PWRITE is performed by the media controller 202. Before the PWRITE is completed, the media controller 202 checks to see if the input parameters that are related to the persistent memory have exceeded the corresponding IPTs, as shown in block 332. If the corresponding IPTs have been exceeded by at least one of the input parameter values, the process 300 signals a write not completed 334 signal and transmits this signal to the host device, as shown at block 370. If the corresponding IPTs have not been exceeded, the process 300 proceeds to decision block 336 which analyzes whether the input parameters related to the persistent memory are near the IPTs (e.g., within a certain parameter value of the IPT). For example, a power consumption parameter can be set to where if the power consumption is within five, for example, percentage points of the IPT for power consumption, the decision block would indicate that "Yes" the IPTs are near the parameter limit and then generate an alert the host signal, as shown at block 338. The signal would be sent back to the host as shown in block 370. If the input parameters are not near the IPTs, the process 300 proceeds to decision block 340 which analyzes whether the PWRITE buffer is full, at decision block 340. If the PWRITE buffer is full, a buffer full signal is generated at block 342 and sent along to the host, as shown at block 370. If the PWRITE buffer is not full, the write credit buffer proceeds to perform the PWRITE 316 to the persistent memory in the NVDIMM 200. When the PWRITE is performed, the write credit counter 210 will decrement by one for PWRITEs.

Additional processes may also be included. It should be understood that the processes depicted in FIG. 3 represent illustrations, and that other processes may be added or existing processes may be removed, modified, or rearranged without departing from the scope and spirit of the present disclosure.

In one or more embodiments of the invention, the write credit buffer 208 can include a buffer for XWRITEs and a buffer for PWRITEs which can be configured based on the performance needs of a host system. For a balanced performance, the XWRITE buffer and PWRITE buffer can be the same size which provides equal performance for the volatile and the non-volatile memories. The thermal and power consumption is balanced and the application utilizing the NVDIMM 200 would not require more of one type of WRITE. For a volatile memory optimized scenario, the XWRITE buffer is larger than the PWRITE buffer. This scenario will throttle non-volatile memory performance. This scenario can be utilized when trying to reduce energy consumption and heat issues by throttling writes to the non-volatile memory. For a non-volatile memory optimized scenario, the XWRITE buffer is smaller than the PWRITE buffer which allows for higher performance of the non-volatile memory. This scenario can be utilized for applications requiring high persistent memory performance.

Figure 4:
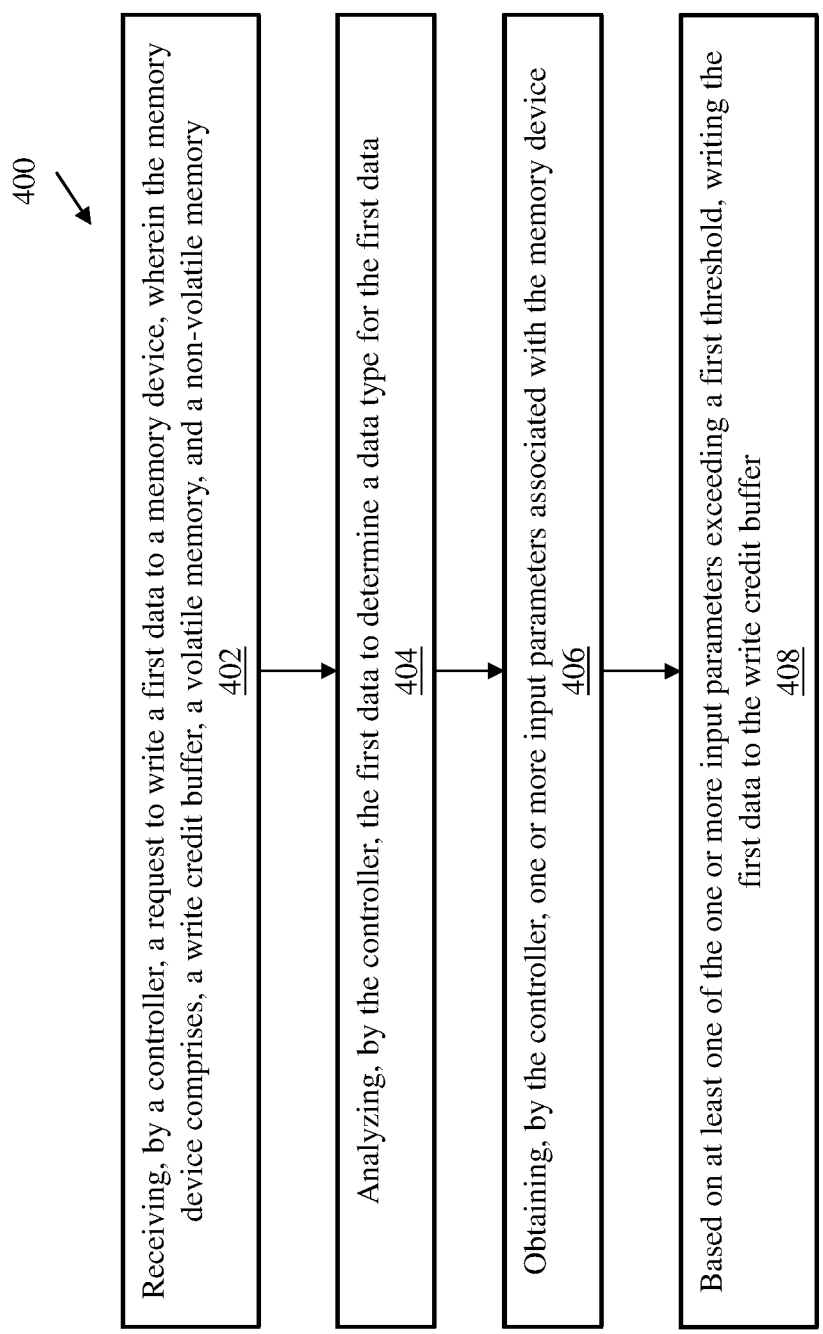
FIG. 4 depicts a flow diagram of a method for buffer management in a memory device according to one or more embodiments of the invention.

FIG. 4 depicts a flow diagram of a method for buffer management in a memory device according to one or more embodiments of the invention. The method 400 includes receiving, by a controller, a request to write the first data to a memory device, wherein the memory device comprises, a write credit buffer, a volatile memory, and a non-volatile memory, as shown at block 402. At block 404, the method 400 includes analyzing, by the controller, the first data to determine a data type for the first data. The method 400, at block 406, also includes obtaining, by the controller, one or more input parameters associated with the memory device. And based on at least one of the one or more input parameters exceeding the first threshold, the method 400 includes writing the first data to the write credit buffer, as shown at block 408.

Additional processes may also be included. It should be understood that the processes depicted in FIG. 4 represent illustrations and that other processes may be added or existing processes may be removed, modified, or rearranged without departing from the scope and spirit of the present disclosure.

The present invention may be a system, a method, and/or a computer program product at any possible technical detail level of integration. The computer program product may include the computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system for buffer management in a memory device, the system comprising:
   a controller in the memory device, the controller configured to:
      receive a request to write a first data to the memory device;
      analyze the first data to determine a data type for the first data wherein the first data type for the first data comprises a persistent data type;
      obtain one or more input parameters associated with the memory device; and
      based on at least one of the one or more input parameters exceeding a first threshold, write the first data to a write credit buffer;
      obtain a persistent data threshold and a dynamic data threshold; and
      based at least in part on a determination that the persistent data threshold exceeds the dynamic data threshold, analyze the one or more input parameters to determine an action for the first data.

2. The system of claim 1, wherein the controller is further configured to:
   based on the one or more input parameters being below the first threshold, write the first data to the memory device.

3. A computer-implemented method for buffer management in a memory device, the method comprising:
   receiving, by a controller, a request to write a first data to a memory device;
   analyzing, by the controller, the first data to determine a data type for the first data, wherein the first data type for the first data comprises a persistent data type;
   obtaining, by the controller, one or more input parameters associated with the memory device;
   based on at least one of the one or more input parameters exceeding a first threshold, writing the first data to a write credit buffer;
   obtaining a persistent data threshold and a dynamic data threshold; and
   based at least in part on a determination that the persistent data threshold exceeds the dynamic data threshold, analyzing the one or more input parameters to determine an action for the first data.

4. The computer-implemented method of claim 3, further comprising:
   based on the one or more input parameters being below the first threshold, writing the first data to the memory device.

5. The computer-implemented method of claim 4, wherein the memory device comprises a volatile memory and a non-volatile memory.

6. The computer-implemented method of claim 5, wherein writing the first data to the memory device comprises writing the first data to the volatile memory based on the data type comprising a dynamic data type.

7. The computer-implemented method of claim 5, wherein writing the first data to the memory device comprises writing the first data to the non-volatile memory based on the data type comprising a persistent data type.

8. The computer-implemented method of claim 3, wherein determining an action for the first data comprises:
comparing the one or more input parameters to the first threshold;
based on a determination that at least one of the one or more input parameters exceed the first threshold, transmitting a signal to a host device, wherein the signal comprises a write not complete signal.

9. The computer-implemented method of claim 3, wherein determining an action for the first data comprises:
comparing the one or more input parameters to the first threshold;
based on a determination that at least one of the one or more input parameters is within a first parameter value of the first threshold, transmitting a signal to a host device, wherein the signal comprises a warning signal to the host device.

10. The computer-implemented method of claim 3, wherein the write credit buffer comprises a persistent write buffer and a dynamic write buffer;
wherein determining an action for the first data comprises:
based a determination that the persistent write buffer is full, transmitting a signal to a host device, delaying writing the first data to the write credit buffer.

11. The computer-implemented method of claim 3, wherein the one or more input parameters comprise a bandwidth requirement, a power requirement, and a performance requirement for the memory device.

12. The computer-implemented method of claim 3, wherein the memory device is a non-volatile dual inline memory module (NVDIMM) device.

13. A computer program product for buffer management in a memory device, the computer program product comprising a computer readable storage medium having program instructions embodied therewith, wherein the computer readable storage medium is not a transitory signal per se, the program instructions executable by a controller to cause the controller to perform a method comprising:
receiving, by a controller, a request to write a first data to a memory device;
analyzing, by the controller, the first data to determine a data type for the first data, wherein the first data type for the first data comprises a persistent data type;
obtaining, by the controller, one or more input parameters associated with the memory device;
based on at least one of the one or more input parameters exceeding a first threshold, writing the first data to the write credit buffer;
obtaining a persistent data threshold and a dynamic data threshold; and
based at least in part on a determination that the persistent data threshold exceeds the dynamic data threshold, analyzing the one or more input parameters to determine an action for the first data.

14. The computer program product of claim 13, further comprising:
based on the one or more input parameters being below the first threshold, writing the first data to the memory device.

* * * * *